United States Patent
Ponsford et al.

(10) Patent No.: US 8,359,497 B2
(45) Date of Patent: Jan. 22, 2013

(54) DETERMINING THE CAUSE OF SERIALIZATION FAILURES

(75) Inventors: Matthew James Ponsford, Sydney (AU); Richard Bremner, Sydney (AU); Kenneth Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/818,527

(22) Filed: Jun. 18, 2010

(65) Prior Publication Data

US 2011/0314327 A1    Dec. 22, 2011

(51) Int. Cl.
G06F 11/00 (2006.01)
(52) U.S. Cl. ........ 714/54; 714/38.1; 714/38.14; 714/49; 707/899
(58) Field of Classification Search ............... 714/38.1, 714/38.14, 54
See application file for complete search history.

(56) References Cited

U.S. PATENT DOCUMENTS

| 6,301,585 | B1 | 10/2001 | Milne |
| 7,627,578 | B2 | 12/2009 | Dearing et al. |
| 2005/0108627 | A1* | 5/2005 | Mireku ......................... 715/513 |
| 2005/0154968 | A1* | 7/2005 | Lesartre et al. ................ 714/800 |
| 2005/0160328 | A1* | 7/2005 | Lesartre et al. .................. 714/48 |
| 2006/0047685 | A1* | 3/2006 | Dearing et al. ................ 707/102 |
| 2006/0176943 | A1* | 8/2006 | Sindalovsky et al. ......... 375/225 |
| 2008/0046869 | A1* | 2/2008 | Lambert et al. ............... 717/136 |
| 2008/0098119 | A1* | 4/2008 | Jindal et al. ................... 709/228 |
| 2009/0064206 | A1* | 3/2009 | Olderdissen .................. 719/330 |
| 2009/0182912 | A1* | 7/2009 | Yoo et al. ........................ 710/71 |

* cited by examiner

Primary Examiner — Chae Ko
(74) Attorney, Agent, or Firm — Patterson & Sheridan, LLP (57) ABSTRACT

A method, computer program product, and system determining the cause of serialization failures is described. A method may comprise, if a first object that has been serialized with all references to member fields by the first object removed passes deserialization, restoring, via at least one of a client electronic device and a server computer, a first reference to a first member field by the first object. The method may further comprise serializing, via at least one of the client electronic device and the server computer, the first object with the restored first reference to the first member field. The method may also comprise, if the serialized first object with the restored first reference to the first member field fails deserialization, determining, via at least one of the client electronic device and the server computer, that the first reference to the first member field by the first object causes the failure.

23 Claims, 4 Drawing Sheets

DETERMINING THE CAUSE OF SERIALIZATION FAILURES

BACKGROUND OF THE INVENTION

This disclosure relates to serialization and, more particularly, to methodologies for determining the cause of serialization failures.

Software applications may convert an object or graph of objects into a sequence of bits. These bits may persist on a storage medium or may be transmitted across a network. The process of converting the object or graph of objects into the sequence of bits may be referred to as serialization. The reverse process of converting those bits back into the object or graph of objects may be referred to as deserialization.

Serialization may be used, for example, to share a user's session data for a web application between web application servers, or to store the state of some data objects in a database. Serializing an object may result in other objects referenced by that object also being serialized. The objects that those secondary objects reference may also be serialized, and so on until an entire graph of objects may be written to a byte stream.

Some objects may not be serializable, or the serialization code they may depend on may fail. Accordingly, errors may occur when attempting to deserialize these objects or graphs of objects. As such, there may be a need to improve ways to test an object or object graph to determine if it is serializable.

BRIEF SUMMARY OF THE INVENTION

In a first embodiment, a method may comprise, if a first object that has been serialized with all references to member fields by the first object removed passes deserialization, restoring, via at least one of a client electronic device and a server computer, a first reference to a first member field by the first object. The method may further comprise serializing, via at least one of the client electronic device and the server computer, the first object with the restored first reference to the first member field. The method may also comprise, if the serialized first object with the restored first reference to the first member field fails deserialization, determining, via at least one of the client electronic device and the server computer, that the first reference to the first member field by the first object causes the failure.

One or more of the following features may be included. A second reference to a second member field by the first object may be restored if the serialized first object with the restored first reference to the first member field passes deserialization. The first object with the restored second reference to the second member field may be serialized. If the serialized first object with the restored second reference to the second member field fails deserialization, the second reference to the second member field by the first object may be determined to cause the failure. Each reference by the first object may be iteratively restored while serializing and deserializing the first object after each iteration. If the serialized first object with a restored n'th reference to an n'th member field fails deserialization, the n'th reference to the n'th member field by the first object may be determined to cause the failure.

In some implementations, the first object may be serialized with all references to member fields by the first object present. All references to member fields by the first object may be removed if the serialized first object with all references to member fields present fails deserialization. Further, the first object may be serialized with all references to member fields by the first object removed. If the serialized first object with all references to member fields removed fails deserialization, it may be determined that the first object causes the failure. If it is known that the first member field will not cause a deserialization failure, the first member field may be ignored. The method may also comprise at least one of removing the first reference to the first member field by the first object and removing the second reference to the second member field by the first object. The first member field referenced by the first object may be from a second object. Additionally, the method may comprise determining if at least one of the first object and the second object include custom serialization code. At least one of the first object and the second object may be ignored if at least one of the first object and the second object include custom serialization code.

In second embodiment, a computer program product may reside on a computer readable storage medium and may have a plurality of instructions stored on it. When executed by a processor, the instructions may cause the processor to perform operations comprising, if a first object that has been serialized with all references to member fields by the first object removed passes deserialization, restoring a first reference to a first member field by the first object. The operations may further comprise serializing the first object with the restored first reference to the first member field. The operations may also comprise, if the serialized first object with the restored first reference to the first member field fails deserialization, determining that the first reference to the first member field by the first object causes the failure.

One or more of the following features may be included. A second reference to a second member field by the first object may be restored if the serialized first object with the restored first reference to the first member field passes deserialization. The first object with the restored second reference to the second member field may be serialized. If the serialized first object with the restored second reference to the second member field fails deserialization, the second reference to the second member field by the first object may be determined to cause the failure. Each reference by the first object may be iteratively restored while serializing and deserializing the first object after each iteration. If the serialized first object with a restored n'th reference to an n'th member field fails deserialization, the n'th reference to the n'th member field by the first object may be determined to cause the failure.

In some implementations, the first object may be serialized with all references to member fields by the first object present. All references to member fields by the first object may be removed if the serialized first object with all references to member fields present fails deserialization. Further, the first object may be serialized with all references to member fields by the first object removed. If the serialized first object with all references to member fields removed fails deserialization, it may be determined that the first object causes the failure. If it is known that the first member field will not cause a deserialization failure, the first member field may be ignored. The operations may also comprise at least one of removing the first reference to the first member field by the first object and removing the second reference to the second member field by the first object. The first member field referenced by the first object may be from a second object. Additionally, the operations may comprise determining if at least one of the first object and the second object include custom serialization code. At least one of the first object and the second object may be ignored if at least one of the first object and the second object include custom serialization code.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to, if a first object that has been serialized with all references to member fields by the first object removed passes deserialization, restore a first reference to a first member field by the first object. Further, the computing system may include a second software module configured to serialize the first object with the restored first reference to the first member field. Additionally, the computing system may include a third software module configured to, if the serialized first object with the restored first reference to the first member field fails deserialization, determine that the first reference to the first member field by the first object causes the failure.

One or more of the following features may be included. A second reference to a second member field by the first object may be restored if the serialized first object with the restored first reference to the first member field passes deserialization. The first object with the restored second reference to the second member field may be serialized. If the serialized first object with the restored second reference to the second member field fails deserialization, the second reference to the second member field by the first object may be determined to cause the failure. Each reference by the first object may be iteratively restored while serializing and deserializing the first object after each iteration. If the serialized first object with a restored n'th reference to an n'th member field fails deserialization, the n'th reference to the n'th member field by the first object may be determined to cause the failure.

In some implementations, the first object may be serialized with all references to member fields by the first object present. All references to member fields by the first object may be removed if the serialized first object with all references to member fields present fails deserialization. Further, the first object may be serialized with all references to member fields by the first object removed. If the serialized first object with all references to member fields removed fails deserialization, it may be determined that the first object causes the failure. If it is known that the first member field will not cause a deserialization failure, the first member field may be ignored. The system may also comprise a software module configured for at least one of removing the first reference to the first member field by the first object and removing the second reference to the second member field by the first object. The first member field referenced by the first object may be from a second object. Additionally, the system may comprise a software module configured to determine if at least one of the first object and the second object include custom serialization code. At least one of the first object and the second object may be ignored if at least one of the first object and the second object include custom serialization code.

DETAILED DESCRIPTION OF THE INVENTION

Figure 1:
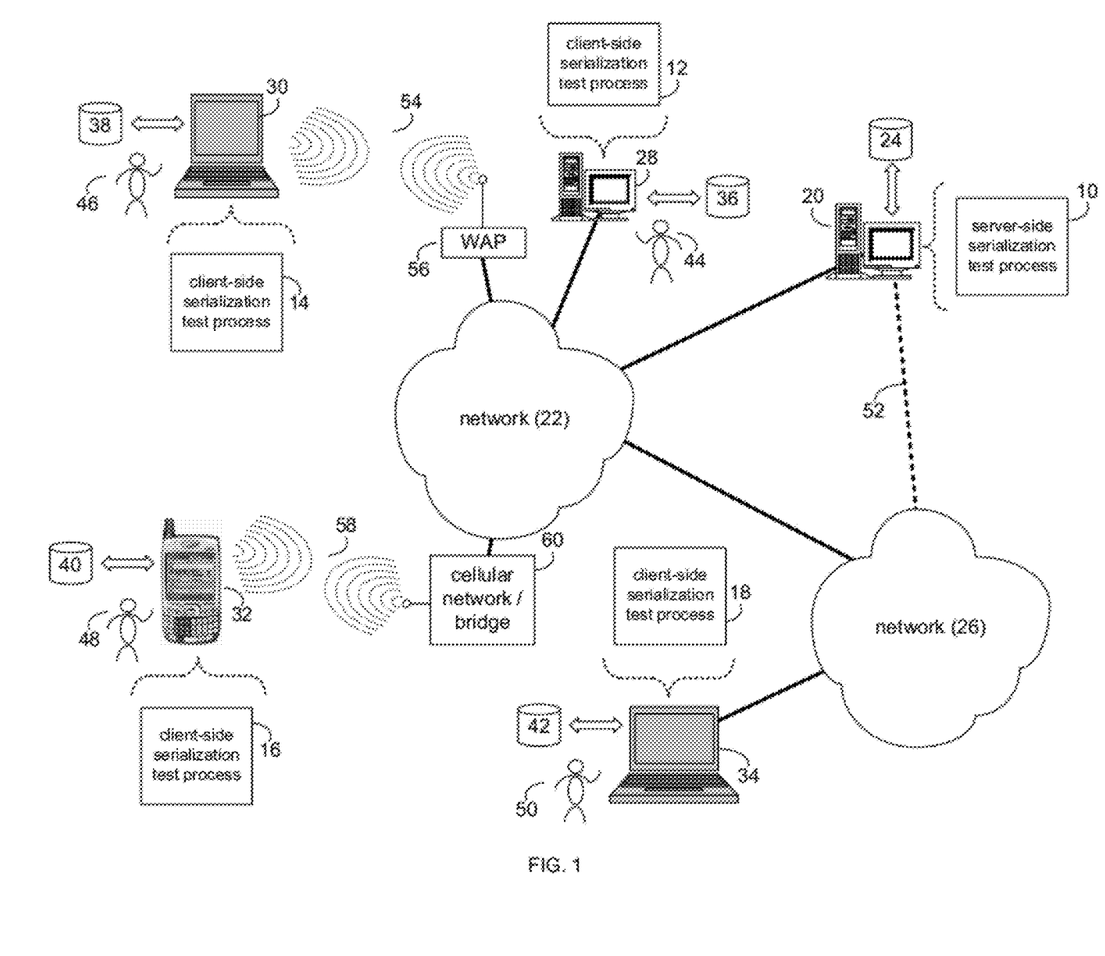
FIG. 1 is a diagrammatic view of a serialization test process coupled to a distributed computing network.
Figure 2:
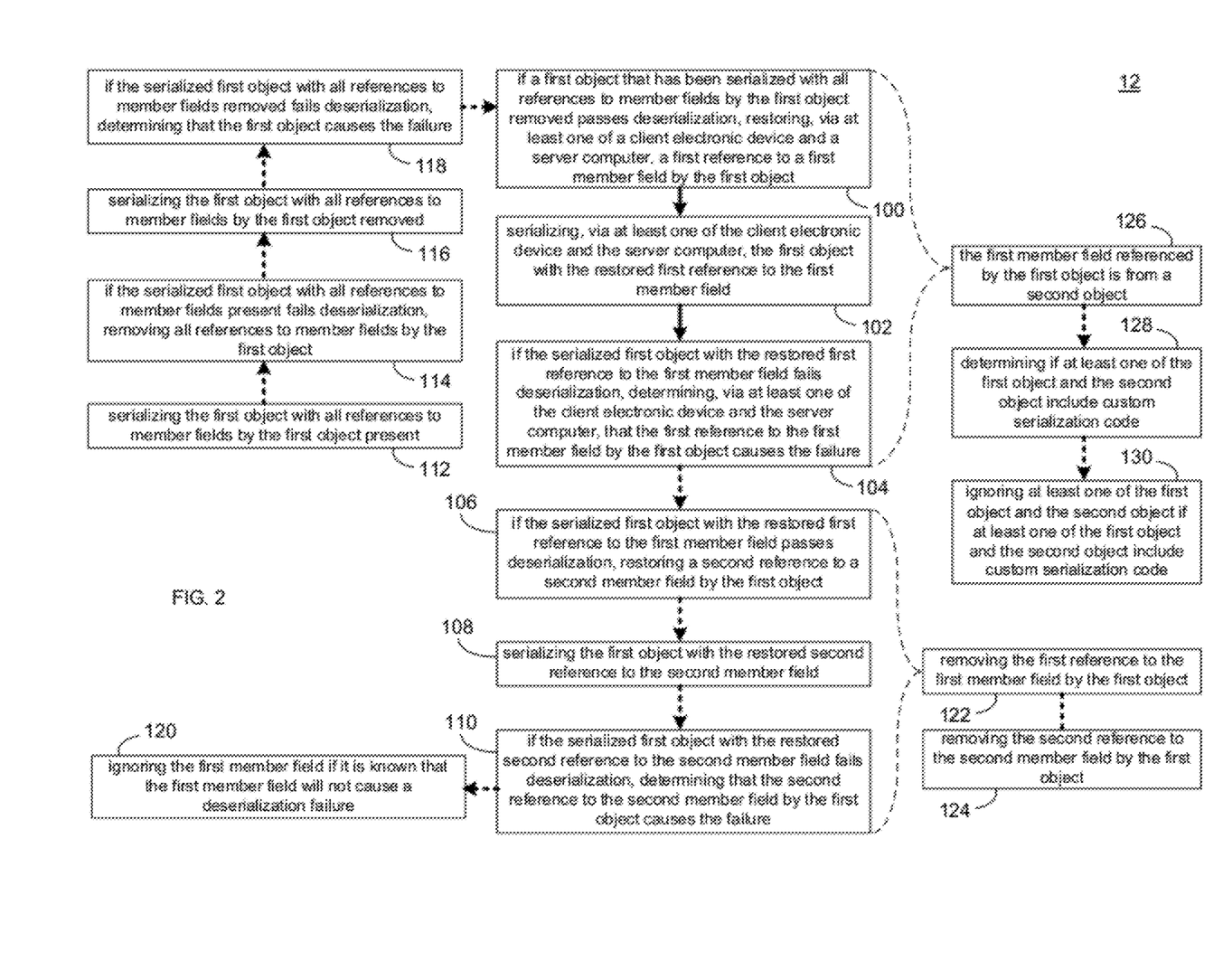
FIG. 2 is a flowchart of the serialization test process of FIG. 1.

Referring to FIGS. 1 & 2, there is shown a serialization test process 12. As will be discussed below, if a first object that has been serialized with all references to member fields by the first object removed passes deserialization, serialization test process 12 may restore 100, a first reference to a first member field by the first object. The first object with the restored first reference to the first member field may be serialized 102. If the serialized first object with the restored first reference to the first member field fails deserialization, the first reference to the first member field by the first object may be determined 104 to cause the failure.

The serialization test (ST) process may be a server-side process (e.g., server-side ST process 10), a client-side process (e.g., client-side ST process 12, client-side ST process 14, client-side ST process 16, or client-side ST process 18), or a hybrid server-side/client-side process (e.g., the combination of server-side ST process 10 and one or more of client-side ST processes 12, 14, 16, 18).

Server-side ST process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side ST process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side ST processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side ST processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives;

tape drives; optical drives; RAID arrays; random access memories (RAM); read-only memories (ROM); compact flash (CF) storage devices; secure digital (SD) storage devices; and memory stick storage devices.

Client-side ST processes 12, 14, 16, 18 and/or server-side ST process 10 may be processes that run within (i.e., are part of) an application to be tested. Alternatively, client-side ST processes 12, 14, 16, 18 and/or server-side ST process 10 may be stand-alone applications that work in conjunction with the application to be tested. One or more of client-side ST processes 12, 14, 16, 18 and server-side ST process 10 may interface with each other (via network 22 and/or network 26) to allow a plurality of users (e.g., users 44, 46, 48, 50) to share information. In one implementation client-side ST processes 12, 14, 16, 18 and/or server-side ST process 10 may be processes that may be applied to a web application in order to test whether or not a web application session is serializable.

Users 44, 46, 48, 50 may access server-side ST process 10 directly through the device on which the client-side ST process (e.g., client-side ST processes 12, 14, 16, 18) is executed, namely client electronic devices 28, 30, 32, 34, for example. Users 44, 46, 48, 50 may access server-side ST process 10 directly through network 22 and/or through secondary network 26. Further, server computer 20 (i.e., the computer that executes server-side ST process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Serialization Test Process

ST process 10 may test an object to ensure that it is serializable. If the test fails, ST process 10 may test each object referenced by the object in an object graph in order to identify which object may be causing a serialization/deserialization problem. In this way, ST process 10 may iteratively test each referenced object until the root cause of the problem is identified. For the following discussion, server-side ST process 10 will be described for illustrative purposes. Client-side ST process 12 may be incorporated into server-side ST process 10 and may be executed within one or more applications that allow for communication with client-side ST process 12. However, this is not intended to be a limitation of this disclosure, as other configurations are possible (e.g., stand-alone, client-side ST processes and/or stand-alone server-side ST processes.) For example, some implementations may include one or more of client-side ST processes 14, 16, 18 in place of or in addition to client-side ST process 12.

Figure 3:
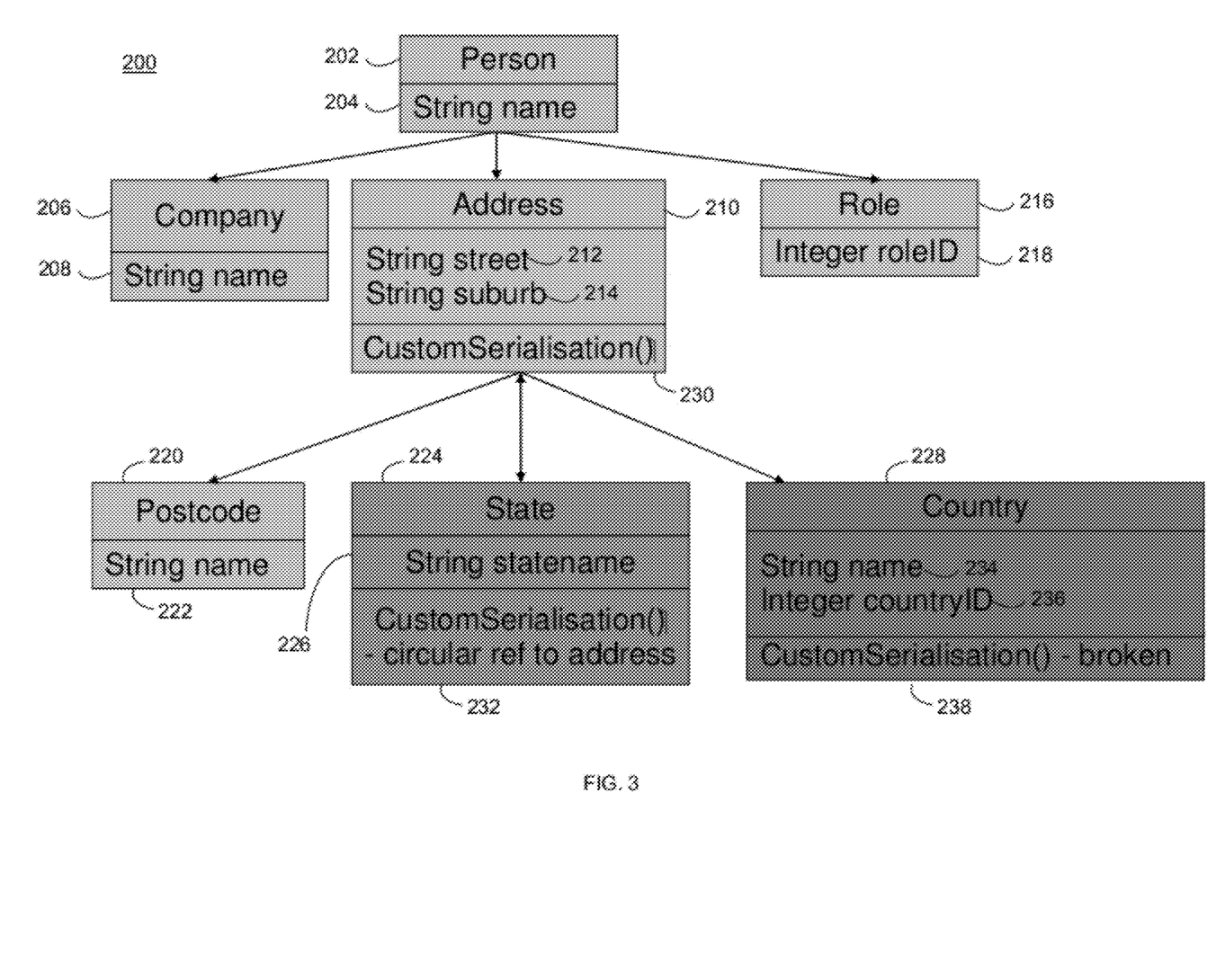
FIG. 3 is an object graph which may be associated with the serialization test process.

Referring now to FIGS. 1-3, object graph 200 may show the relationships and references between, for example, objects used in a web application. For example, object graph 200 may be used in a web application that accepts as input various types of information (e.g., name, company, address, role, postcode, state, country, etc.) from a user during a web application session. Server-side ST process 10 may serialize 112 a first object (e.g., Person 202) with all references to member fields (e.g., String name 204, Company 206 including String name 208, Address 210 including String street 212 and String suburb 214, and Role 216 including integer RoleID 218) by the first object (e.g., Person 202) present. Person 202, Company 206, Address 210, Role 216, Postcode 220, State 224, and Country 228 may be objects in object graph 200.

In object graph 200, Person 202 may reference String name 204, Company 206, Address 210, and Role 216. Address 210 may reference String street 212, String suburb 214, Postcode 220, State 224, and Country 228. State 224 may reference String statename 226 and Address 210. In this example, Address 210 and State 224 may reference each other. Country 228 may reference String name 234 and Integer countryID 236. Some objects in object graph 200 may use a serialization mechanism built into a programming language (e.g., Java™ and/or Java™ Runtime Environment). In this example, Address 210, State 224, and Country 228 may implement custom serialization code (e.g., custom serialization code 230, 232, and 238.

As discussed above, serialization may include the process of converting an object and/or graph of objects into a sequence of bits. Objects being serialized may be serializable (i.e., capable of being written to a stream of bytes). Some programming languages and for example, the Java™ programming language, may include a default serialization implementation. These programming languages may allow for a class to be marked as serializable. As mentioned, it may also be possible to implement custom serialization code.

The serialization process may not always succeed. For example, objects in the object graph (e.g., object graph 200) may not be serializable. Further, the custom serialization code on which objects may depend may fail. In some circumstances, a serialization engine, such as Java™ Virtual Machine may provide an error message (e.g., NotSerializableException) indicating that a class and/or object was not serializable. Also, when custom serialization code is being used, an indication (e.g., StreamCorrputedException) may be provided that one of the bytes in the stream was not expected.

As mentioned above, deserialization may be the process of converting the serialized bits of an object back into the object. If a serialized object fails deserialization, it may be because the serialized bits could not be converted back into the object. If a serialized object passes deserialization, it may be because the serialized bits could be converted back into the object. ST process 10 may iteratively test each referenced object until the root cause of the problem (i.e., the reason why serialization was unsuccessful) is identified, and may provide an indication that an object was not serializable.

Continuing with the above example, ST process 10 may remove 114 all reference to member fields (e.g., String name 204, Company 206 including String name 208, Address 210 including String street 212 and String suburb 214, and Role 216 including integer RoleID 218) by the first object (e.g., Person 202), if the serialized first object with all references to member fields present fails deserialization. Further, ST process 10 may serialize 116 the first object (e.g., Person 202) with all references to member fields (e.g., String name 204, Company 206 including String name 208, Address 210 including String street 212 and String suburb 214, and Role 216 including integer RoleID 218) by the first object (e.g., Person 202) removed. If the serialized first object with all references to member fields (e.g., String name 204, Company 206 including String name 208, Address 210 including String street 212 and String suburb 214, and Role 216 including integer RoleID 218) removed fails deserialization, ST process 10 may determine 118 that the first object (e.g., Person 202) causes the failure. In other words, in this example, the failure may not have been due to a reference to a member field (e.g., String name 204, Company 206 including String name 208, Address 210 including String street 212 and String suburb 214, and Role 216 including integer RoleID 218), but rather the failure may lie in the first object (e.g., Person 202) itself.

Assume for illustrative purposes that the first object (e.g. Person 202) that has been serialized with all references to member fields (e.g., String name 204, Company 206 including String name 208, Address 210 including String street 212 and String suburb 214, and Role 216 including integer RoleID 218) by the first object removed passes deserialization. In order to find the object causing the serialization problem, ST process 10 may iteratively add back the references to the member fields (e.g., String name 204, Company 206 including String name 208, Address 210 including String street 212 and String suburb 214, and Role 216 including integer RoleID 218) one at a time to see which reference causes the failure. For example, ST process 10 may add back (i.e., restore) reference to the member field String name 204 and test serialization by again serializing and deserializing the first object (e.g., Person 202). If the first object (e.g., Person 202) then passes deserialization, it may be ruled out that the serialization problem lies in the first object (e.g., Person 202). Similarly, ST process 10 may restore Company 206 (i.e., another object referenced by Person 202) and test serialization again. If the first object (e.g., Person 202) again passes deserialization, it may be ruled out that the serialization problem lies in Company 206.

Continuing with the above example, a first object (e.g., Person 202) that has been serialized with all references to member fields (e.g., String name 204, Company 206 including String name 208, Address 210 including String street 212 and String suburb 214, and Role 216 including integer RoleID 218) by the first object (e.g., Person 202) removed passes deserialization, ST process 10 may restore 100 a first reference to a first member field (e.g., Address 210) by the first object (e.g., Person 202). ST Process 10 may again test the first object (e.g., Person 202) by serializing and deserializing the first object (e.g., Person 202). As such, ST process 10 may serialize 102 the first object (e.g., Person 202) with the restored first reference to the first member field (e.g., Address 210). If the serialized first object (e.g., Person 202) with the restored first reference to the first member field (e.g., Address 210) fails deserialization, ST process 10 may determine 104 that the first reference to the first member field (e.g., Address 210) by the first object causes the failure.

As mentioned above, ST process 10 may iteratively restore references to the member fields by the first object, while serializing and deserializing the first object each time. If the serialized first object (e.g., Person 202) with the restored first reference to the first member field (e.g., Address 210) passes deserialization, ST process 10 may restore 106 a second reference to a second member field (e.g., Role 216) by the first object. ST process 10 may then serialize 108 the first object (e.g., Person 202) with the restored second reference to the second member field (e.g., Role 216). If the serialized first object (e.g., Person 202) with the restored second reference to the second member field (e.g., Role 216) fails deserialization, ST process 10 may determine 110 that the second reference to the second member field (e.g., Role 216) by the first object causes the failure.

It should be noted that the terms "first object", "first reference", "first member field", "second reference", and "second member field" are used for illustrative purposes only. The term "first object" may refer to an object that ST process 10 happens to be testing. Any number of objects may have been tested before, and may be tested after, the first object. The terms "first reference" and "second reference" may each, respectively, refer to a reference of the first object restored during an n'th iteration of the test. In other words, the terms "first reference" and "second reference" may not necessarily refer to the literal first reference or the literal second reference restored by ST process 10 during the test of the first object. Any number of references may have been restored before, and may be restored after, either the first reference or the second reference. Further, the terms "first member field" and "second member field" may each, respectively, refer to a member field that is referenced by the first object. In other words, the terms "first member field" and "second member field" may not necessarily refer to the literal first member field or the literal second member field referenced by the first object.

In this way, ST process 10 may iteratively restore each reference by the first object while serializing and deserializing the first object during each iteration. If the serialized first object with the restored n'th reference to the n'th member field fails deserialization, ST process 10 may determine that the n'th reference to the n'th member field by the first object causes the failure.

Referring back to the example where ST process 10 may determine 104 that the first reference to the first member field (e.g., Address 210) by the first object causes the failure, since Address 210 also references other member fields (e.g., String street 212, String suburb 214, Postcode 220, State 224, and Country 228), it may need to be investigated further. For example, Address 210 itself may be serialized and deserialized and Address 210 may pass deserialization. ST process 10 may remove all member fields (e.g., String street 212, String suburb 214, Postcode 220, State 224, and Country 228) referenced by Address 210. Again, Address 210 may be serialized and deserialized with all member fields (e.g., String street 212, String suburb 214, Postcode 220, State 224, and Country 228) referenced by Address 210 removed. Address 210 may again pass deserialization. ST process 10 may then iteratively restore each member field (e.g., String street 212, String suburb 214, Postcode 220, State 224, and Country 228) referenced by Address 210, serializing and deserializing each time. For example, ST process 10 may restore String street 212 and serialize and deserialize Address 210. Address 210 may again pass deserialization. ST process 10 may then restore String suburb 214 and serialize and deserialize Address 210. Address 210 may again pass deserialization. ST process 10 may then restore Postcode 220 and serialize and deserialize Address 210. Address 210 may again pass deserialization.

Continuing with the above example, ST process 10 may then restore State 224 and serialize and deserialize Address 210. Address 210 may fail deserialization. As such, ST process 10 may determine that State 224 may cause Person 202 to fail deserialization. Since State 224 references other member fields (e.g., String statename 226 and Address 210), State 224 may need to be investigated further. For example, State 224 may itself be serialized and deserialized. State 224 may fail deserialization. ST process 10 may remove all member fields (e.g., String statename 226 and Address 210) referenced by State 224. ST process 10 may then serialize and deserialize State 224 with reference to all member fields (e.g., String statename 226 and Address 210) removed. State 224 may pass deserialization. ST process 10 may then restore String statename 226 and serialize and deserialize State 224. State 224 may again pass deserialization. ST process 10 may then restore Address 210 and again serialize and deserialize State 224. In this example, State 224 may fail deserialization because both Address 210 and State 224 may implement custom serialization code (e.g., custom serialization 230 and 232) that refers to each other's member fields during deserialization. For example, Address 210 may refer to State 224 while being deserialized, however State 224 may not have been deserialized yet, so the member fields of State 224 may not be initialized. This may cause State 224 to be in an invalid state.

The failure of State 224 to deserialize may allow ST process 10 to determine that the reference from State 224 to Address 210 may cause the failure. Since Address 210 has already been investigated, it may not need to be investigated again. ST process 10 may inform a developer and/or administrator that Person 202 was not serializable because of the reference from State 224 to Address 210. The developer may fix the serialization failure by removing the reference from State 224 to Address 210, or may fix the custom serialization code. Alternatively, ST process 10 may remove 122 the first reference to the member field (e.g., the reference from State 224 to Address 210) by the first object (e.g., Person 202). Similarly, ST process 10 may remove 124 the second reference to the second member field (e.g., Role 216 as discussed above) by the first object, if the second reference is determined to cause the failure.

Figure 4:
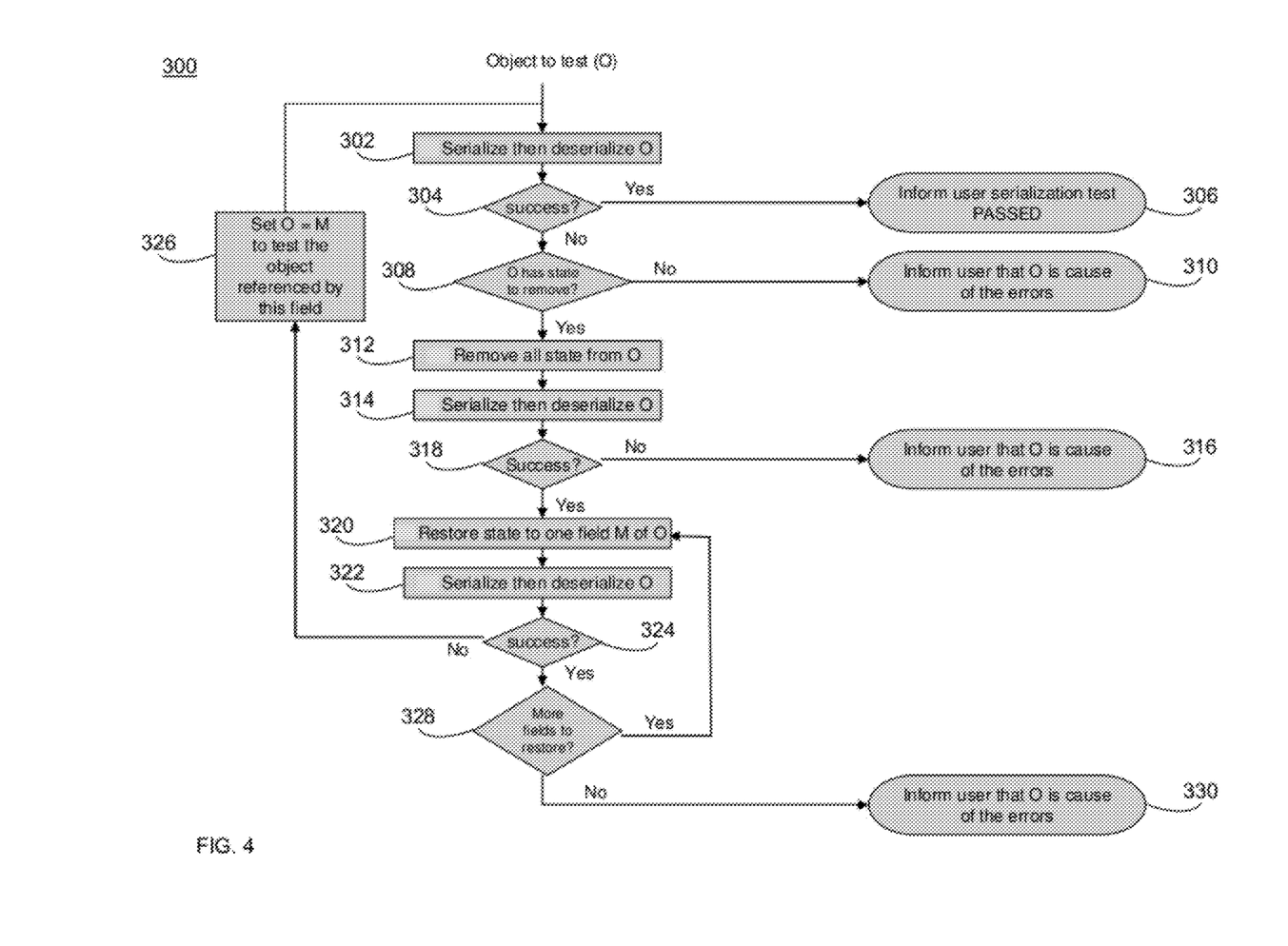
FIG. 4 is another flowchart of the serialization test process of FIG. 1.

Referring now to FIG. 4, ST process 10 may test an object "O" for serialization failure. ST process 10 may serialize and deserialize 302 object O. As discussed above, this may include serializing object O to a byte stream. Further, ST process 10 may deserialize the byte stream. If there are no errors (i.e., the deserialization was a success (304)), the test may stop. This may indicate that there may be no serialization failure associated with object O. ST process 10 may inform (306) a user that object O passed the serialization test. If there is at least one error (i.e., the deserialization was unsuccessful and the test failed), ST process 10 may check (308) to see if object O has a state that can be removed. If object O does not have a state that can be removed, ST process 10 may stop the test. This may indicate that object O may be the cause of the at least one error. ST process 10 may inform (310) the user that object O is the cause of the at least one error.

If object O does have at least one state that can be removed, ST process 10 may remove (312) all states from O. In Java™, this may involve setting every member field of object O to null. This may be done using Java™ Reflection API's. ST process 10 may then serialize and deserialize (314) object O again. This may include serializing object O to a byte stream and deserializing the byte stream. If there is at least one error, the stateless object O may be the cause of the serialization failure. ST process 10 may stop the test, and may inform (316) the user that object O is the cause of the error.

If there are no errors (i.e., the deserialization was a success (318)), one of the member fields of object O may be responsible for the failure. ST process 10 may restore (320) the state of object O to one field M of object O. In Java™, this may be done using Java™ Reflection API's. ST process 10 may then serialize and deserialize (322) object O again. This may again include serializing object O to a byte stream and deserializing the byte stream. If there is at least one error, the object that this field references (e.g., field M), or one of its members, may be the cause of the failure. In this case ST process 10 may set (326) object O to an object referenced by field M.

Further, if there are no errors (i.e., the deserialization was a success (324)), ST process 10 may check (328) to see if there are more fields to restore in object O. If there are more fields to restore, ST process 10 may restore (320) another member field of object O. If there are no more fields of object O to restore, ST process 10 may stop the test. This may indicate that object O is the cause of the at least one error. ST process 10 may inform (330) the user that object O is the cause of the at least one error.

In this way, by recursively drilling deeper and deeper into a graph of objects, ST process 10 may determine the one or more object references that lead to the object that may cause the serialization failure. This graph may be recorded along the way, and may provide the user with a list of member fields that reference the problematic object. For example, the following may be recorded:

Class MyObjectA; Field fieldA (field type MyObjectB);
Class MyObjectB; Field fieldB (field type MyObjectC);
Class MyObjectC; Field fieldC (field type MyObjectD);
Class MyObjectD is responsible for the serialization error.

As shown above, from this recording, the user may see that an object of type MyObjectD was responsible for the serialization error. This object may have been referenced by fieldC of MyObjectC, which may have been referenced by fieldB of MyObjectB, which may have been referenced by fieldA of MyObjectA. The developer may then take action to either fix the serialization of MyObjectD, or remove the reference to MyObjectD altogether.

Referring back to FIGS. 2 & 3, in some implementations, ST process 10 may ignore 120 the first member field (e.g., Role 216, for this example) if it is known that the first member field (e.g., Role 216, for this example) will not cause a deserialization failure. These types of member fields may include, but are not limited to, primitive types (e.g., Int, Long, Boolean, etc.), primitive wrappers (e.g., Integer, Long, Boolean, etc.), and Strings. Further, if a member field is a known object type that may include a collection of other objects, all members of the collection may be removed when all states are removed from the object. In Java™, this may include the Collection and Map classes. Further, members of the collection may be restored, one at a time, when each state of the object is iteratively restored (320) as shown in FIG. 4. In this way, ST process 10 may identify which member of the collection may cause the serialization problem.

In another implementation, the first member field referenced (e.g., String street 212, for this example) by the first object (e.g., Person 202, for this example) may be (126) from a second object (e.g., Address 210, for this example). ST process 10 may determine 128 if at least one of the first object (e.g., Person 202, for this example) and the second object, (e.g. Address 210, for this example) include custom serialization code (e.g., custom serialization 230 of Address 210). If an object includes custom serialization code, the custom serialization code may fail when the state is removed from the object's member fields. For example, the custom serialization code may assume that one or more member fields are not null. This can be identified by ST process 10. ST process 10 may inspect whether or not the object implements its own custom serialization code, and may ignore common errors caused by a null state (e.g., NullPointerExceptions). ST process 10 may ignore 130 at least one of the first object (e.g., Person 202) and the second object (e.g., Address 210) if at least one of the first object (e.g., Person 202) and the second object (e.g., Address 210) include custom serialization code (e.g., custom serialization 230 of Address 210). This may allow ST process 10 to continue drilling down to the cause of the serialization problem while ignoring errors introduced by removal of the object state.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
if a first object that has been serialized with all references to member fields by the first object removed passes deserialization, restoring, via at least one of a client electronic device and a server computer, a first reference to a first member field by the first object;
serializing, via at least one of the client electronic device and the server computer, the first object with the restored first reference to the first member field; and
if the serialized first object with the restored first reference to the first member field fails deserialization, determining, via at least one of the client electronic device and the server computer, that the first reference to the first member field by the first object causes the failure.

2. The method of claim 1 further comprising:
if the serialized first object with the restored first reference to the first member field passes deserialization, restoring a second reference to a second member field by the first object;
serializing the first object with the restored second reference to the second member field; and
if the serialized first object with the restored second reference to the second member field fails deserialization, determining that the second reference to the second member field by the first object causes the failure.

3. The method of claim 1 further comprising:
iteratively restoring each reference by the first object while serializing and deserializing the first object after each iteration; and
if the serialized first object with a restored n'th reference to an n'th member field fails deserialization, determining that the n'th reference to the n'th member field by the first object causes the failure.

4. The method of claim 1 further comprising:
serializing the first object with all references to member fields by the first object present;
if the serialized first object with all references to member fields present fails deserialization, removing all references to member fields by the first object;
serializing the first object with all references to member fields by the first object removed; and
if the serialized first object with all references to member fields removed fails deserialization, determining that the first object causes the failure.

5. The method of claim 1 further comprising:
ignoring the first member field if it is known that the first member field will not cause a deserialization failure.

6. The method of claim 2 further comprising at least one of:
removing the first reference to the first member field by the first object; and
removing the second reference to the second member field by the first object.

7. The method of claim 1 wherein the first member field referenced by the first object is from a second object.

8. The method of claim 7 further comprising:
determining if at least one of the first object and the second object include custom serialization code; and
ignoring at least one of the first object and the second object if at least one of the first object and the second object include custom serialization code.

9. A computer program product residing on a computer readable storage medium having a plurality of instructions stored thereon, which, when executed by a processor, cause the processor to perform operations comprising:
if a first object that has been serialized with all references to member fields by the first object removed passes deserialization, restoring a first reference to a first member field by the first object;
serializing the first object with the restored first reference to the first member field; and
if the serialized first object with the restored first reference to the first member field fails deserialization, determining that the first reference to the first member field by the first object causes the failure.

10. The computer program product of claim 9 further comprising instructions for:
if the serialized first object with the restored first reference to the first member field passes deserialization, restoring a second reference to a second member field by the first object;
serializing the first object with the restored second reference to the second member field; and
if the serialized first object with the restored second reference to the second member field fails deserialization, determining that the second reference to the second member field by the first object causes the failure.

11. The computer program product of claim 9 further comprising instructions for:
iteratively restoring each reference by the first object while serializing and deserializing the first object after each iteration; and
if the serialized first object with a restored n'th reference to an n'th member field fails deserialization, determining that the n'th reference to the n'th member field by the first object causes the failure.

12. The computer program product of claim 9 further comprising instructions for:
serializing the first object with all references to member fields by the first object present;
if the serialized first object with all references to member fields present fails deserialization, removing all references to member fields by the first object;
serializing the first object with all references to member fields by the first object removed; and
if the serialized first object with all references to member fields removed fails deserialization, determining that the first object causes the failure.

13. The computer program product of claim 9 further comprising instructions for:
ignoring the first member field if it is known that the first member field will not cause a deserialization failure.

14. The computer program product of claim 10 further comprising instructions for at least one of:
removing the first reference to the first member field by the first object; and
removing the second reference to the second member field by the first object.

15. The computer program product of claim 9 wherein the first member field referenced by the first object is from a second object.

16. The computer program product of claim 15 further comprising instructions for:
determining if at least one of the first object and the second object include custom serialization code; and
ignoring at least one of the first object and the second object if at least one of the first object and the second object include custom serialization code.

17. A computing system comprising:
at least one processor;

at least one memory architecture coupled with the at least one processor;

a first software module executed on the at least one processor and the at least one memory architecture, wherein the first software module is configured to, if a first object that has been serialized with all references to member fields by the first object removed passes deserialization, restore a first reference to a first member field by the first object;

a second software module executed on the at least one processor and the at least one memory architecture, wherein the second software module is configured to serialize the first object with the restored first reference to the first member field; and a third software module executed on the at least one processor and the at least one memory architecture, wherein the third software module is configured to, if the serialized first object with the restored first reference to the first member field fails deserialization, determine that the first reference to the first member field by the first object causes the failure.

18. The computing system of claim 17 further comprising:

a fourth software module executed on the at least one processor and the at least one memory architecture, wherein the fourth software module is configured to, if the serialized first object with the restored first reference to the first member field passes deserialization, restore a second reference to a second member field by the first object;

a fifth software module executed on the at least one processor and the at least one memory architecture, wherein the fifth software module is configured to serialize the first object with the restored second reference to the second member field; and a sixth software module executed on the at least one processor and the at least one memory architecture, wherein the sixth software module is configured to, if the serialized first object with the restored second reference to the second member field fails deserialization, determine that the second reference to the second member field by the first object causes the failure.

19. The computing system of claim 17 further comprising:

a seventh software module executed on the at least one processor and the at least one memory architecture, wherein the seventh software module is configured to iteratively restore each reference by the first object while serializing and deserializing the first object after each iteration; and an eighth software module executed on the at least one processor and the at least one memory architecture, wherein the eighth software module is configured to, if the serialized first object with a restored n'th reference to an n'th member field fails deserialization, determine that the n'th reference to the n'th member field by the first object causes the failure.

20. The computing system of claim 17 further comprising:

a ninth software module executed on the at least one processor and the at least one memory architecture, wherein the ninth software module is configured to serialize the first object with all references to member fields by the first object present;

a tenth software module executed on the at least one processor and the at least one memory architecture, wherein the tenth software module is configured to, if the serialized first object with all references to member fields present fails deserialization, remove all references to member fields by the first object;

an eleventh software module executed on the at least one processor and the at least one memory architecture, wherein the eleventh software module is configured to serialize the first object with all references to member fields by the first object removed; and a twelfth software module executed on the at least one processor and the at least one memory architecture, wherein the twelfth software module is configured to, if the serialized first object with all references to member fields removed fails deserialization, determine that the first object causes the failure.

21. The computing system of claim 17 further comprising:

a thirteenth software module executed on the at least one processor and the at least one memory architecture, wherein the thirteenth software module is configured to ignore the first member field if it is known that the first member field will not cause a deserialization failure.

22. The computing system of claim 18 further comprising at least one of:

a fourteenth software module executed on the at least one processor and the at least one memory architecture, wherein the fourteenth software module is configured to remove the first reference to the first member field by the first object; and a fifteenth software module executed on the at least one processor and the at least one memory architecture, wherein the fifteenth software module is configured to remove the second reference to the second member field by the first object.

23. The computing system of claim 17 wherein the first member field referenced by the first object is from a second object.

* * * * *